United States Patent [19]

Cloeren

[11] Patent Number: 5,120,484
[45] Date of Patent: Jun. 9, 1992

[54] COEXTRUSION NOZZLE AND PROCESS

[75] Inventor: Peter F. Cloeren, Orange, Tex.

[73] Assignee: The Cloeren Company, Orange, Tex.

[21] Appl. No.: 664,928

[22] Filed: Mar. 5, 1991

[51] Int. Cl.$^5$ .................... B29C 47/06; B29C 47/12
[52] U.S. Cl. ................... 264/171; 425/131.1; 425/133.5; 425/462
[58] Field of Search ............ 264/171; 425/462, 131.1, 425/133.5

[56] References Cited

U.S. PATENT DOCUMENTS

| | | | |
|---|---|---|---|
| 2,387,718 | 10/1945 | Coleman | 425/461 |
| 3,715,420 | 2/1973 | Kiyono et al. | 264/171 |
| 3,849,045 | 11/1974 | Ohkawa et al. | 425/462 |
| 3,909,170 | 9/1975 | Riboulet et al. | 425/462 |
| 4,197,069 | 4/1980 | Cloeren | 425/131.1 |
| 4,410,602 | 10/1983 | Komoda et al. | 428/516 |
| 4,476,075 | 10/1984 | Brinkmann et al. | 264/40.7 |
| 4,521,359 | 6/1985 | Tsein | 264/104 |
| 4,533,510 | 8/1985 | Nissel | 264/171 |
| 4,562,023 | 12/1985 | Pabst et al | 264/75 |
| 4,653,994 | 3/1987 | Capelle | 425/462 |
| 4,731,004 | 3/1988 | Wenz, Jr. | 425/462 |
| 4,780,258 | 10/1988 | Cloeren | 425/462 |
| 4,784,815 | 11/1988 | Cloeren et al. | 425/462 |

FOREIGN PATENT DOCUMENTS

| | | | |
|---|---|---|---|
| 2851930 | 6/1980 | Fed. Rep. of Germany | 425/462 |
| 2853850 | 6/1980 | Fed. Rep. of Germany | 264/171 |

Primary Examiner—Jeffery Thurlow
Attorney, Agent, or Firm—Timothy R. Kroboth

[57] ABSTRACT

The present invention provides a novel extrusion apparatus and process that are advantageous for converging rheologically dissimilar streams. Advantageously, stream convergence is effected proximate to the exit orifice to obviate or reduce the time migration effect. In an edge-laminating extrusion die in accordance with the invention, the width of an edge of an edge-laminated product may be mechanically defined.

19 Claims, 6 Drawing Sheets

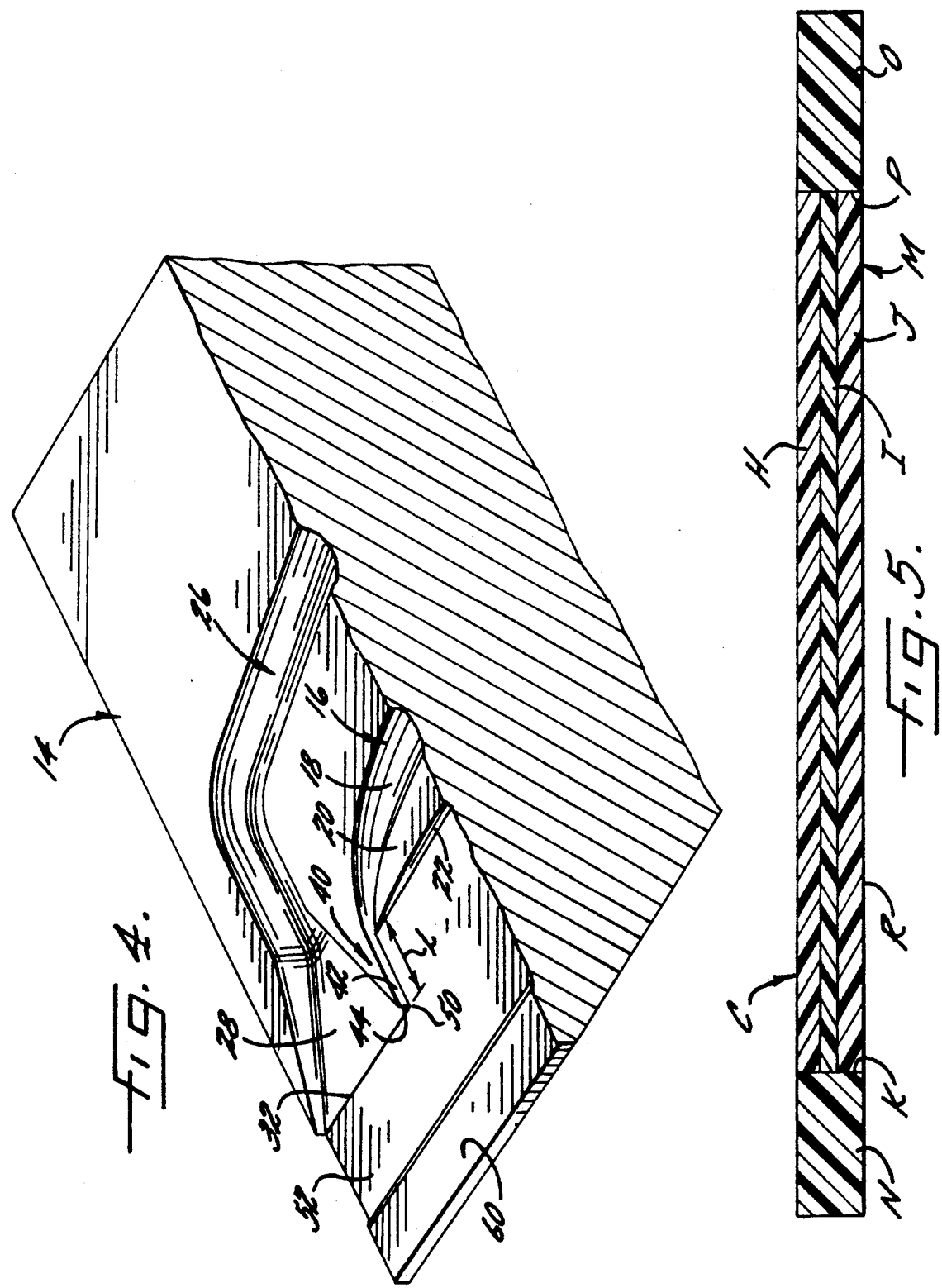

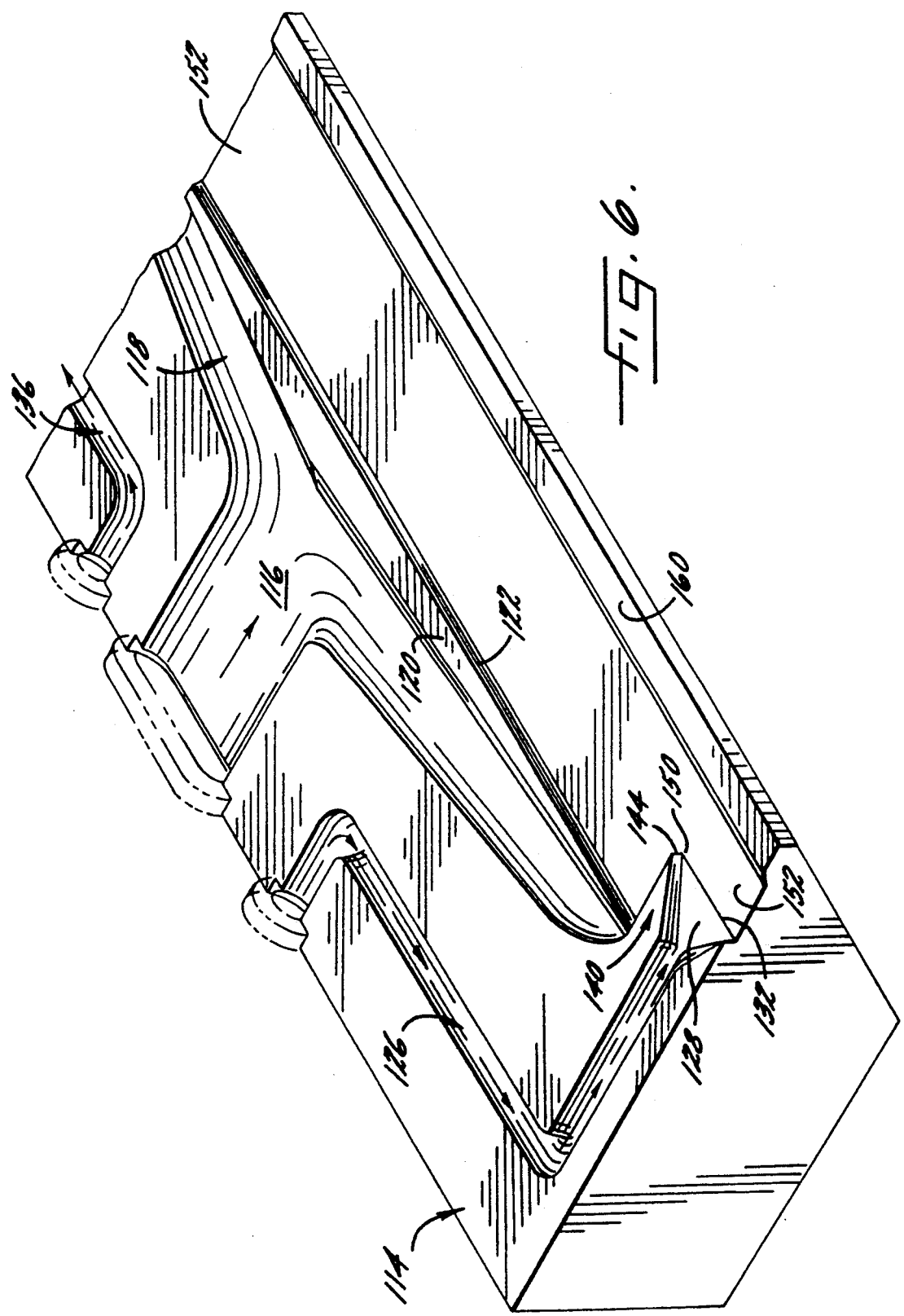

COEXTRUSION NOZZLE AND PROCESS

BACKGROUND OF THE INVENTION

This invention relates to coextrusion of sheet and film product, particularly to edge-lamination, especially of thermoplastic compositions such as synthetic resins.

Forming a composite stream, in particular an edge-laminated composite stream, in a feedblock is described in U.S. Pat. No. 4,784,815 to Cloeren and Werney. Forming a composite stream in a die manifold is illustrated by U.S. Pat. No. 3,715,420 to Kiyono. Forming an edge-laminated composite stream downstream of a die manifold is exemplified by German patent document 2,851,930. In each of the foregoing patent documents, flow pressure of one stream is utilized to displace a portion of another stream.

Mechanically dividing a single manifold into segments and forming an edge-laminated sheet downstream of the manifold is illustrated by U.S. Pat. No. 4,533,510 to Nissel. The use of an apparatus in which the manifolds or flow channels are vertically oriented relative to one another, to form a composite stream, is exemplified by U.S. Pat. Nos. 4,197,069 to Cloeren and U.S. Pat. No. 4,410,602 to Komoda et al.

The formation of a composite sheet in an extrusion die including side-by-side die manifolds, is illustrated by U.S. Pat. No. 4,476,075 to Brinkmann et al, U.S. Pat. No. 4,562,023 to Pabst et al, and U.S. Pat. No. 4,521,359 to Tsein. Brinkmann et al and Pabst et al describe sheet formed from a colorless stream and a dyed stream of polyvinyl butyral. Tsein describes sheet formed from elliptically shaped streams matched with respect to their melt indices.

Extruded product including a core that may be one or more layers, and including a narrow or wide edge layer on one or both sides of the core, is commercially available. However, a difficulty exists in providing a sharp and well-defined edge seam or boundary when the seam is formed by converging streams of dissimilar rheological properties.

Accordingly, there remains a need for an improved extrusion apparatus and process that are advantageous for converging streams, and in particular a core stream and an edge-laminating stream, of dissimilar rheological properties. Beneficially, such an apparatus would provide an edge seam that is sharp and well-defined. Advantageously, such an extrusion apparatus could mechanically define the width of an edge of an edge-laminated product.

SUMMARY OF THE INVENTION

It is accordingly an object of the present invention to provide an improved extrusion apparatus and process that are advantageous for converging streams, in particular a core stream and an edge-laminating stream, of dissimilar rheological properties.

It is a further object to provide an improved extrusion nozzle that provides an edge seam that is sharp and well-defined.

It is a still further object to provide an edge-laminating, extrusion nozzle that is able to mechanically determine the width of an edge of an edge-laminated product.

Additional objects, advantages and novel features of the present invention are set forth in the description that follows, and in part will become apparent to those skilled in the art upon examination of the following description or may be learned by practice of the invention. The objects and advantages of the invention may be realized and attained by means of instrumentalities and combinations particularly pointed out in the appended claims.

To achieve the foregoing objects and in accordance with the purpose of the present invention, as embodied and broadly described herein, there is provided a unique extrusion die or nozzle. The extrusion die includes a first flow channel that includes a first transverse flow-providing chamber. The die further includes a second flow channel that includes a second transverse flow-providing chamber. The second transverse flow-providing chamber is disposed exterior to, and in a lateral orientation relative to, the first transverse flow-providing chamber.

The first and second flow channels are separated by a member that terminates in a point. The first flow channel has a locus of termination of lateral flow, situated upstream of the point. The first and second flow channels converge at a locus of convergence within the die; and downstream of the point. A common flow channel leads to an exit orifice of the extrusion die. A particularly critical feature of the die is that the locus of convergence is disposed proximate to the exit orifice.

Also provided is an improved edge-laminating process. By the process, a first transversely spread stream is provided, and in a lateral orientation relative thereto, a second transversely spread stream is provided. The second stream is rheologically dissimilar to the first stream. By rheologically dissimilar is meant, for purposes of illustrating this invention, a dissimilarity in viscosity between the second stream and the first stream or one or more layers of a layered first stream.

In accordance with the process, an edge of the first transversely spread stream is converged with an edge of the second transversely spread stream to form a composite having a width equal to the sum of the widths of the converging streams at the convergence. Lateral flow of the first transversely spread stream is completed upstream of the convergence.

The converging streams are at substantially equal flow volume relative to each other at the convergence. The convergence is at a locus that minimizes lateral migration of an edge seam formed by the converging streams. The edge seam moves in a line generally parallel to a main flow direction of the first transversely spread stream, and deformation of the edge seam is eliminated or reduced.

In a variation of an improved edge-laminating process in accordance with the invention, the converging streams are at unequal flow volume relative to each other at the convergence.

In the drawing and in the detailed description of the invention that follows, there are shown and essentially described only preferred embodiments of this invention, simply by way of illustration of the best mode contemplated by me of carrying out this invention. As will be realized, this invention is capable of other and different embodiments, and its several details are capable of modification in various respects, all without departing from the invention. Accordingly, the drawing and the detailed description are to be regarded as illustrative in nature, and not as restrictive.

BRIEF DESCRIPTION OF THE DRAWING

Reference is now made to the accompanying drawing, which forms a part of the specification of the present invention, and which depicts preferred embodiments of an extrusion apparatus in accordance with the present invention.

FIG. 4 is an enlarged perspective view of a portion of the apparatus of FIG. 1;

FIG. 5 is an enlarged cross-sectional view of an edge-laminated core stream at the exit orifice of the extrusion apparatus of FIG. 1;

FIG. 6 is a perspective view, similar to that of FIG. 1, of another preferred embodiment of an edge-laminating apparatus in accordance with the present invention, showing the lower die body only;

DETAILED DESCRIPTION OF THE INVENTION

As explained above, the present invention is directed to a novel extrusion apparatus and process that are advantageous for converging streams, and in particular a core stream and an edge-laminating stream, of dissimilar rheological properties, that is, for instance, of dissimilar viscosities and elasticities. The core stream will typically consist of more than a single layer. Accordingly, this invention is particularly beneficial for converging an edge-laminating stream with a core stream consisting of one or more streams of dissimilar rheology to the edge-laminating stream. It will be, of course, understood that this invention could be used for converging streams of similar rheological properties.

Beneficially, an edge-laminating extrusion die or nozzle in accordance with this invention, produces an edge seam that is sharp and well-defined. There is no intermixing of streams or deformation at the edge seam. Deformation is generally caused by overlapping or encroaching. Advantageously, an edge-laminating extrusion die in accordance with this invention, is able to mechanically define the width of an edge of an edge-laminated product.

Figure 9:
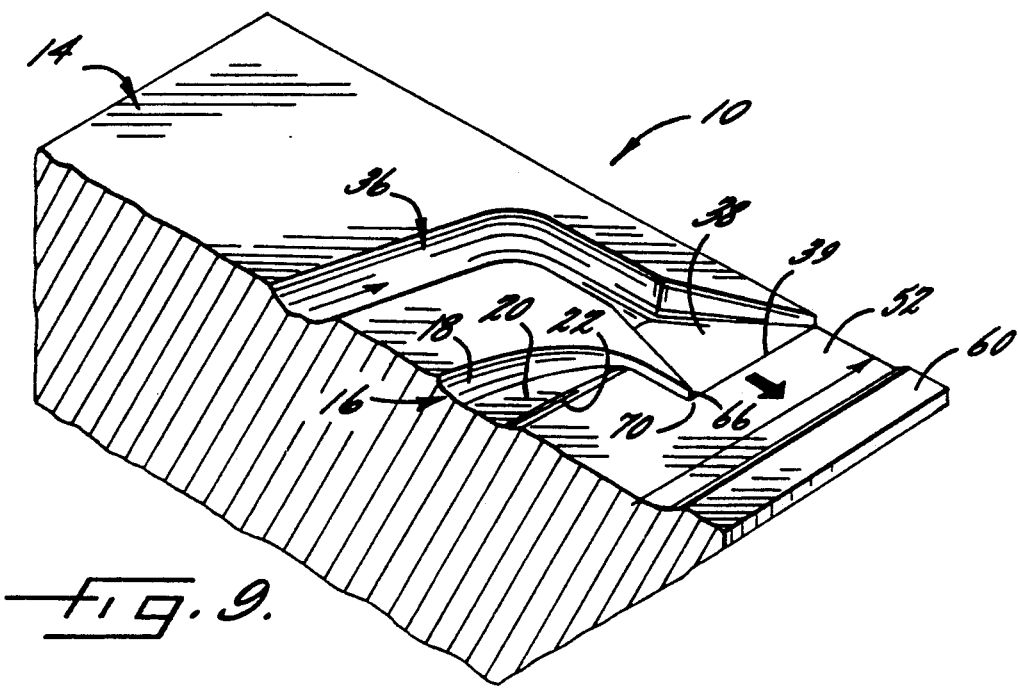
FIG. 9 is an enlarged, perspective view of part of the broken away, lower die body portion of the apparatus of FIG. 1.

Referring to FIGS. 1 to 4, a preferred edge-laminating apparatus 10 in accordance with the present invention, is shown. The apparatus is a flat extrusion die conveniently formed by an upper die body 12 and a lower die body 14. Extrusion die 10 includes flow channels 16,26,36, which converge in a common channel 52 prior to a die exit orifice 62. Convergence of flow channel 36 with flow channel 16 is shown in FIG. 9. Channel 16 is the main channel and channels 26,36 are edge-laminating channels. Enlarged arrows represent the main flow direction through the channels and through apparatus 10.

Figure 1:
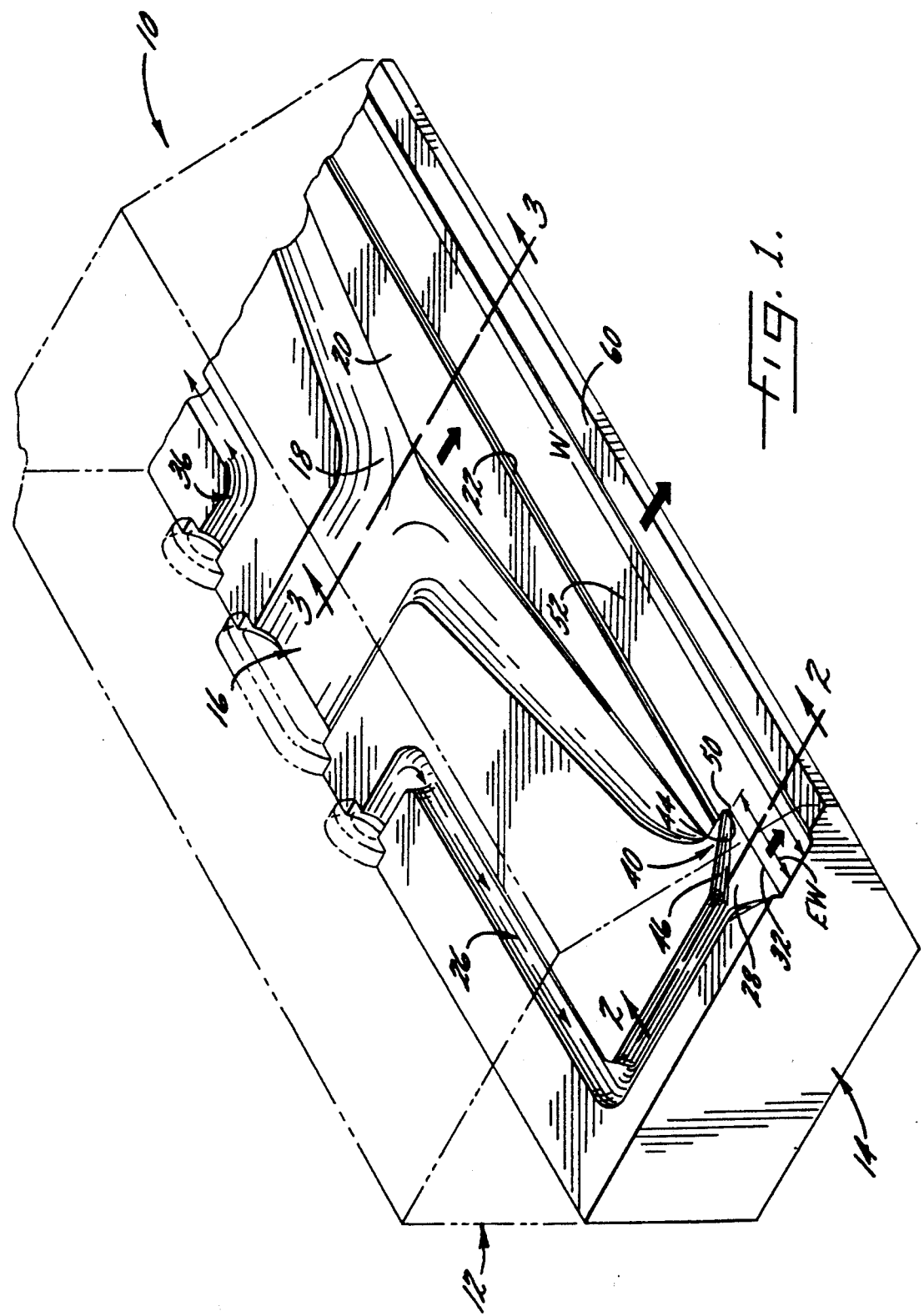
FIG. 1 is a perspective view of a preferred embodiment of an edge-laminating apparatus in accordance with the present invention, with a portion of the apparatus broken away and with an upper die body of the apparatus shown in phantom.

With particular reference to FIG. 1, main flow channel 16 includes a transverse flow-providing chamber 18, which is conveniently a conventional manifold with a conventional preland channel 20 downstream thereof for producing substantially equal flow volume of a core or main stream across the channel width. Alternatively, a transverse flow-providing chamber of another configuration such as a T-shaped configuration, could be used. Preland channel 20 has an output edge 22, which is beneficially rectilinear.

Edge-laminating flow channel 26 includes a transverse flow-providing chamber 28, which is conveniently a conventional fishtail or wedge-shaped chamber. Alternatively, a transverse flow-providing chamber of another configuration could be used in combination with a conventional preland channel. Chamber 28 has an output edge 32, which is beneficially also rectilinear.

Edge-laminating flow channel 36 includes a transverse flow-providing chamber 38, which is shown in FIG. 9 and which is conveniently a wedge-shaped chamber. The configuration of chamber 38 may differ from that of chamber 28 of edge-laminating flow channel 26. Flow channel 36 and chamber 38 are optional features of the present invention, and can be understood from FIG. 9 to have a similar relationship to main channel 16 as is hereafter described for edge-laminating channel 26 and chamber 28.

Transverse flow-providing chamber 28 of edge-laminating channel 26 is disposed exterior to, and in a lateral orientation relative to, transverse flow-providing chamber 18 of main channel 16. A wall member 40 separates flow channels 16,26.

Referring to FIGS. 1 and 4, wall member 40 has a wall portion 42 which begins at output edge 22 of preland 20, and which is generally parallel to the main flow direction of main channel 16. The wall member terminates in a point 44. Wall portion 42 has a length L from output edge 22 to point 44, which may be varied. A wall 46 of wall member 40 is a wall of transverse flow-providing chamber 28 and tapers to point 44.

Flow channels 16,26 converge at a locus of convergence 50 downstream of point 44, in a common flow channel 52. With reference to FIGS. 1 and 9, the common flow channel has a width W, which is the sum of the widths of flow channels 16,26,36 at output edges 22,32,39. The width of output edge 32 is designated EW in FIG. 1.

Figure 2:
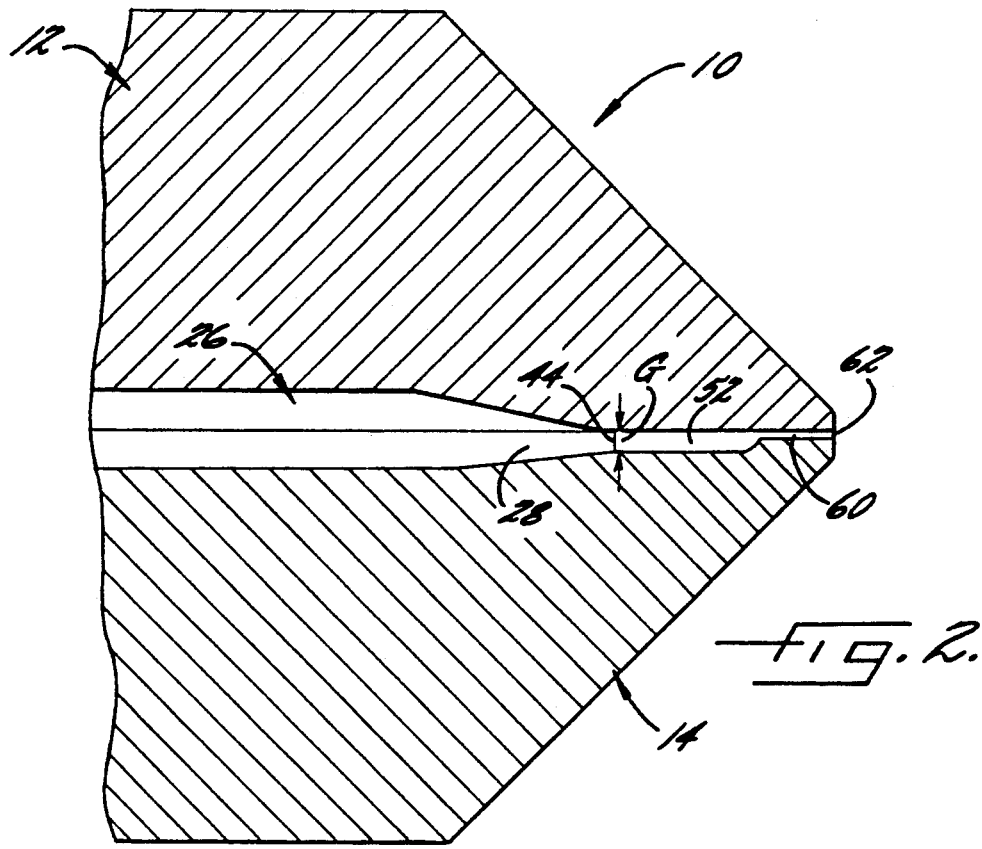
FIG. 2 is an enlarged cross-sectional view taken substantially along line 2—2 of FIG. 1.
Figure 3:
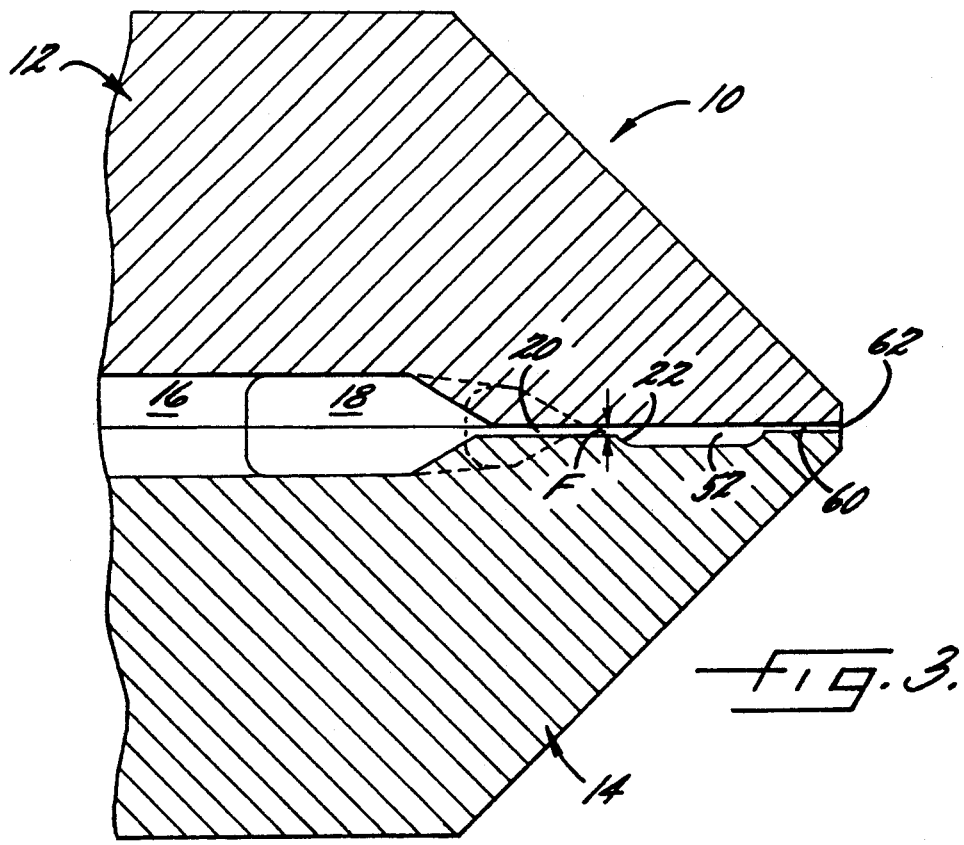
FIG. 3 is an enlarged cross-sectional view taken substantially along line 3—3 of FIG. 1.

Referring to FIG. 3, preland channel 20 of main channel 16 suitably has a constant dimension F in the gap direction, from side to side of the channel. Likewise, with reference to FIGS. 1 and 2, at locus of convergence 50, main channel 16 advantageously has a constant gap G, from side to side. Beneficially, the common flow channel has a relatively greater gap than preland channel 20; however, the gaps of the preland channel and the common flow channel could be the same.

With continued reference to FIG. 1, transverse flow-providing chamber 28 of edge-laminating channel 26 is advantageously oriented with respect to main channel 16, such that a transversely spread stream exiting from channel 26 has a main flow direction generally parallel to the main flow direction of main channel 16. Such an orientation promotes laminar flow of the converged streams. Any other orientation would permit one flow stream to be driven by flow pressure into an edge of the other flow stream, and would result in lateral displacement by the one flow stream of the other flow stream.

Flow stream convergence immediately downstream of point 44 produces the convergence of an edge of a transversely spread stream provided by chamber 18, with an edge of a transversely spread stream provided by chamber 28 and exiting from flow channel 26. The converging edge of the edge-laminating stream is at a right angle with respect to output edge 32 of chamber 28, and generally parallel to the main flow direction of apparatus 10. Likewise, the converging edge of the core stream is at a right angle with respect to output edge 32.

The common flow channel is in fluid communication with a land or exit channel 60, which terminates in an exit orifice 62, shown in FIGS. 2 and 3. However, if appropriate, the common flow channel could also function as the exit channel, in which case the common flow channel would terminate in the exit orifice.

As best seen in FIGS. 2 and 3, common flow channel 52 and exit channel 60 differ from each other in gap. More specifically, exit channel 60 is of relatively smaller gap; however, if appropriate, the exit channel could be of relatively larger gap. Suitably, the exit channel has a width which is the same as width W of the common flow channel, and thus the entire length of the flow passage from point 44 to exit orifice 62 has a constant width W. The exit orifice, as well as the exit channel, suitably has a constant gap from side to side.

With particular reference again to FIG. 4, output edge 22 of preland channel 20 beneficially constitutes a locus of termination of lateral flow for flow channel 16, upstream of point 44. This advantageous feature of flow channel 16 is provided by the generally perpendicular relationship of wall portion 42 of wall member 40 to the lateral flow direction of main flow channel 16. Output edge 22 is substantially upstream of, typically about one-half to two inches above, locus of convergence 50. From output edge 22 to locus of convergence 50, only flow in the main flow direction occurs in the main flow channel.

In the case of flow channel 26, output edge 32 of chamber 28 constitutes a locus of termination of lateral flow. Point 44 forms output edge 32 in part. The locus of termination of lateral flow of channel 26 is immediately prior to locus of convergence 50. Beneficially, the locus of termination of lateral flow for flow channel 26 is downstream of the locus of termination of lateral flow for flow channel 16.

As a critical aspect of the present invention, locus of convergence 50 is located proximate to the exit orifice. By proximate is meant, for purposes of this invention, anywhere from ⅛ to about 3″ upstream of the exit orifice, but most typically about 1 to 2 inches upstream, or with respect to time, from 0.1 to about 5 seconds upstream of the exit orifice, but most typically about 1 to 3 seconds upstream. Proximate location of the locus of convergence obviates or reduces the time migration effect, which would be characterized by lateral migration or deformation of an edge seam formed by the convergence. The extent of potential lateral migration or deformation is a function of, for instance, the respective flow stream viscosities and flow volumes, and the elapsed time between convergence and exit of the composite through the exit orifice. Thus, for a relatively greater difference in flow stream viscosities, the locus of convergence should be relatively closer to the exit orifice, to eliminate the time migration effect.

In operation, a three layer core stream having skin layers of a high performance polymer, is passed through main flow passage 16 and undergoes transverse spreading. The core stream could consist of only a single layer. Transverse or lateral flow of the core stream is completed at output edge 22 of preland channel 20. The core stream then continues to flow in the main flow direction, to produce a flow stabilizing effect, until it reaches locus of convergence 50, which is immediately downstream of point 44.

Concurrently, an edge-laminating stream, rheologically dissimilar to a layer of the core stream, passes through and undergoes transverse spreading in chamber 28 of flow channel 26. Lateral flow of the edge-laminating stream is completed at output edge 32 of chamber 28, which is formed in part by point 44, and which is downstream of the locus of termination of lateral flow of the core stream.

At locus of convergence 50, edge convergence of the two streams occurs to form an edge-laminated composite. Advantageously, each converging stream is at equal flow volume at the locus of convergence. In other words, each individual stream has a substantially equal flow volume per segment of its incremental width across the apparatus, at locus 50. Beneficially, the converging streams are also at substantially equal flow volume relative to each other at the locus of convergence.

Advantageously, no deformation of the edge seam formed by the converging streams, takes place, and the edge seam moves in a line generally parallel to the main flow direction, from point 44 to the exit orifice. As a result, the edge-laminated composite has an edge seam that is sharp and well-defined, and an edge that is substantially equal in width to width EW of output edge 32.

FIG. 5 shows an edge-laminated composite stream C consisting of layers H,I,J of a core stream M and of edge streams N,O. Edge seams K,P separate edge streams N,O from core stream M.

Edge stream O is conveniently the same polymer as edge stream N; however, the edge streams could be different polymers. With reference also to FIG. 9, edge stream O passes through and undergoes transverse spreading in chamber 38 of flow channel 36 prior to convergence at a locus 70 with core stream M. Locus 70 is conveniently the same distance from the exit orifice as is locus 50. Edge stream O is at a relatively greater flow volume than the core stream at locus 70. As a consequence, edge stream O of the composite is of greater width than the width of an output edge 39 of channel 36. Beneficially, edge seam P is free of deformation, and, like edge seam K, is suitably generally perpendicular to a web face R of composite C.

If desired, a composite having an edge stream O of less width than the width of output edge 39 could be formed. This result could be achieved by providing stream M with a relatively greater flow volume than stream O at convergence 70.

As explained earlier, the relative disposition of locus of convergence 50 to exit orifice 62 is a critical aspect of the present invention. Accordingly, in accordance with the present invention, an appropriate location is selected for locus 50, such as about one and one-half inches upstream of exit orifice 62. Thereafter, length L of wall portion 42 of wall member 40 is established to move the transverse flow-providing chamber and output edge of the main flow channel relatively closer to, or further away from, the locus of convergence, to decrease or increase the time for stabilizing flow in the main flow channel prior to convergence. Suitably, the length of wall portion 42 is about ⅜ inch. Reference is now made to the embodiment of FIG. 6, which illustrates a transverse flow-providing chamber 118 and an output edge 122 situated relatively further away from a locus of convergence 150 than chamber 18 and edge 22 are disposed from locus of convergence 50 in the embodiment of FIG. 1.

Like parts of the embodiment of FIG. 6, as well as of other embodiments depicted in the drawing, have been designated with numbers corresponding to like parts of the embodiment of FIG. 1. For sake of brevity, details previously described are not repeated.

Figure 7:
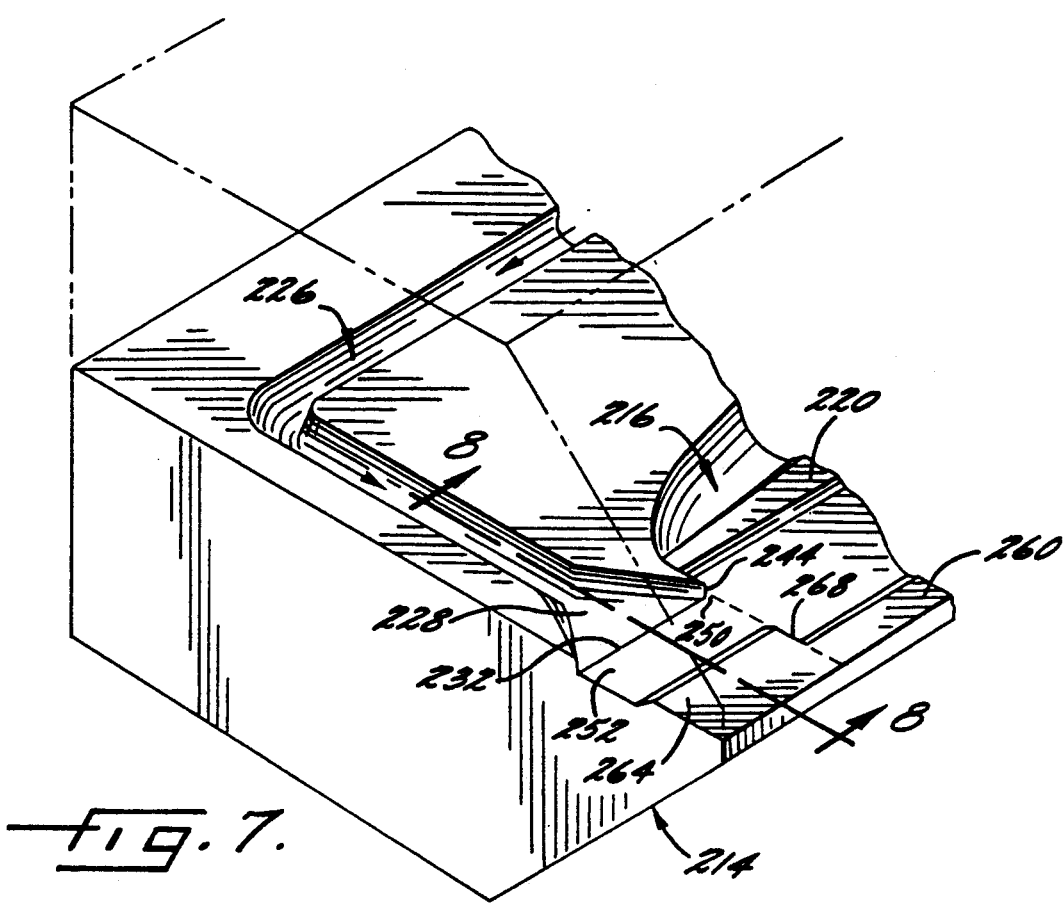
FIG. 7 is a perspective view, similar to that of FIG. 1, of a portion of a third preferred embodiment of an edge-laminating apparatus in accordance with the present invention.
Figure 8:
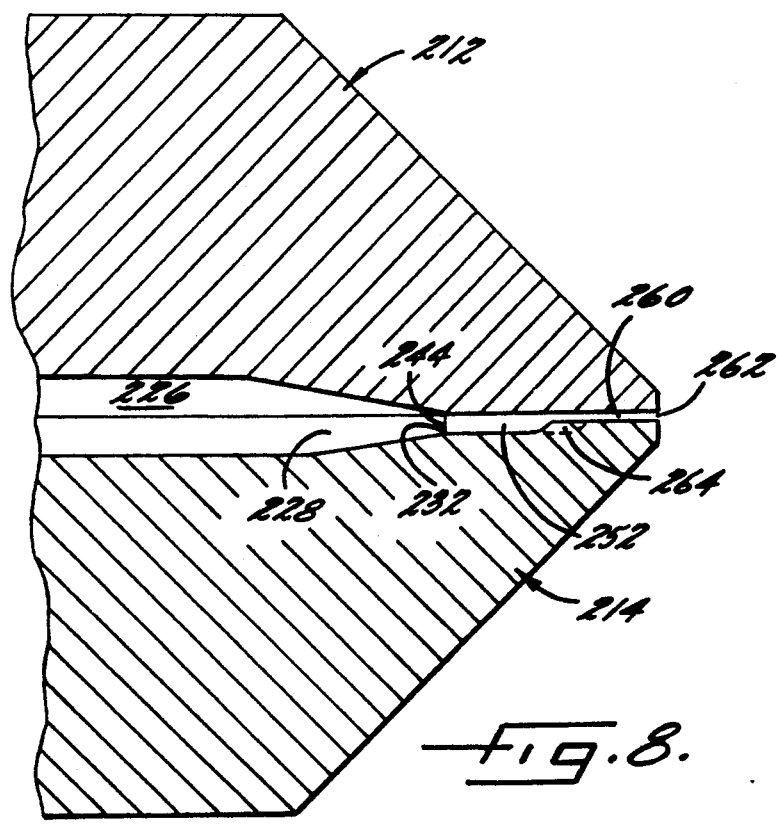
FIG. 8 is a cross-sectional view taken substantially along line 8—8 of FIG. 7.

In a further variation, a portion of exit channel 60 may be of greater length in the main flow direction, than the remainder of the exit channel. FIGS. 7 and 8 show a portion 264 of an exit channel 260 of greater length in the flow path of an edge-laminating flow channel 226. A dashed line from a point 244 to an edge 268 of portion 264, and from edge 268 to an exit orifice 262 (shown in FIG. 8) indicates a common boundary of the flow path of edge-laminating channel 226 and of the flow path of a main flow channel 216, when the converging streams have equal flow volumes relative to each other. This variation is useful when the viscosity of the stream in the main channel is greater than the viscosity of the stream in the edge-laminating channel, and the proximate location of a locus of convergence 250 is not maximized.

Conversely, exit channel 260 could have a portion of greater length in the flow path of main channel 16. This variation is useful when the viscosity of the stream in the main channel is less than the viscosity of the stream in the edge-laminating channel.

Figure 10:
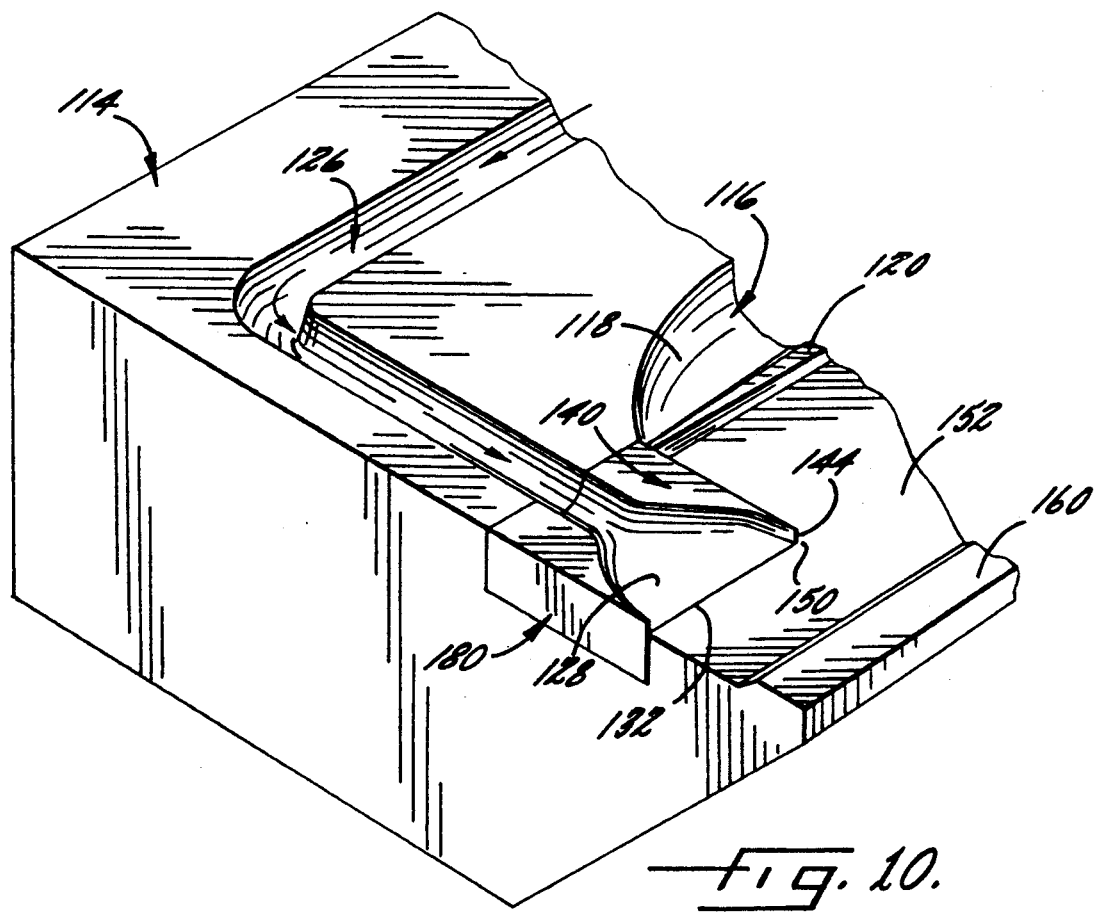
FIG. 10 is a enlarged view similar to that of FIG. 7, of the extrusion apparatus of FIG. 6, showing a modification to the apparatus.

With reference to FIG. 10, which shows a modification of the extrusion die of FIG. 6, a removably mounted assembly 180 may provide a transverse flow-providing chamber 128 of edge-laminating channel 126 and a portion of a wall member 140. FIG. 10 also shows a variation of wall member 140, in which the wall member has an extended length. This variation provides for completion of substantially all transverse flow of the edge-laminating stream substantially upstream of a locus of convergence 150.

In the preceding description of the present invention, there are shown and essentially described only preferred embodiments of this invention, but as mentioned above, it is to be understood that the invention is capable of changes or modifications within the scope of the inventive concept expressed herein. Several changes or modifications have been briefly mentioned for purposes of illustration.

I claim:

1. A coextrusion nozzle comprising a first flow channel comprising a first transverse flow-providing chamber; a second flow channel comprising a second transverse flow-providing chamber disposed exterior to said first transverse flow-providing chamber; said first and second flow channels being separated by a member that terminates in a point, said first flow channel having a locus of termination of lateral flow situated upstream of said point, and said first and second flow channels converging within said coextrusion nozzle at a locus of convergence downstream of said point in a common flow channel of greater width than that of said first flow channel or said second flow channel at said locus of convergence, said common flow channel leading to an exit orifice of said coextrusion nozzle; wherein said second flow channel is laterally oriented with respect to said first flow channel at said locus of convergence such that a main flow channel at said locus of convergence such that a main flow direction of said second flow channel at said locus of convergence is generally parallel to a main flow direction of said first flow channel at said locus of convergence, and flow convergence is provided for; said locus of convergence being disposed proximate to said exit orifice of said coextrusion nozzle.

2. The coextrusion nozzle of claim 1, further comprising an exit channel downstream of and in fluid communication with said common flow channel, said common flow channel and said exit channel differing from each other in gap in a main flow direction of said extrusion die; said exit channel terminating in said exit orifice.

3. The coextrusion nozzle of claim 1, wherein said second flow channel has a locus of termination of lateral flow which is disposed downstream of said locus of termination of lateral flow of said first flow channel.

4. The coextrusion nozzle of claim 3, wherein an output edge of said second flow channel formed in part by said point, constitutes said locus of termination of lateral flow of said second flow channel.

5. The coextrusion nozzle of claim 1, wherein said first flow channel is of constant gap from side to side at said locus of termination of lateral flow.

6. The coextrusion nozzle of claim 1, wherein said first flow channel is of constant gap from side to side at said locus of convergence.

7. The coextrusion nozzle of claim 1, wherein said first flow channel is of relatively greater gap from said locus of termination of lateral flow to said locus of convergence, than immediately prior to said locus of termination of lateral flow.

8. The coextrusion nozzle of claim 1, wherein a removably mounted insert comprises said second transverse flow-providing chamber.

9. The coextrusion nozzle of claim 2, wherein a portion of said exit channel is of greater length in said main flow direction, than the remainder of said exit channel.

10. The coextrusion nozzle of claim 9, wherein said portion of greater length is disposed in the flow path of said second flow channel.

11. An edge-laminating process comprising providing a first transversely spread stream; providing a second transversely spread stream in a lateral orientation relative to said first transversely spread stream in preparation for convergence, said second stream being rheologically dissimilar to said first stream; and converging said first transversely spread stream with said second transversely spread stream to form a composite stream having a width greater than that of either of the converging streams at the convergence; wherein lateral flow of said first transversely spread stream is completed substantially upstream of said convergence, wherein the converging streams are at substantially equal flow volume relative to each other at said convergence, and wherein said convergence is within a coextrusion nozzle at a locus that minimizes lateral migration of an edge seam formed by the convergence and that eliminates or reduces deformation of said edge seam; whereby said edge seam moves in a line generally parallel to a main flow direction of said first transversely spread stream.

12. The process of claim 11, wherein lateral flow of said second transversely spread stream is completed downstream of the completion of said lateral flow of said first transversely spread stream.

13. The process of claim 11, wherein said first transversely spread stream is of constant thickness from side to side substantially prior to and at said convergence.

14. The process of claim 11, wherein said first stream is a layer of a composite stream.

15. An edge-laminating process comprising providing a first transversely spread stream; providing a second transversely spread stream in a lateral orientation relative to said first transversely spread stream in preparation for convergence, said second stream being rheologically dissimilar to said first stream; and converging said first transversely spread stream with said second transversely spread stream to form a composite stream having a width greater than that of either of the converging streams at the convergence; wherein lateral flow of said first transversely spread stream prior to said convergence, is completed substantially upstream of said convergence, wherein the converging streams have unequal flow volumes relative to each other at said convergence, and wherein said convergence is within a coextrusion nozzle at a locus that eliminates or reduces deformation of an edge seam formed by the convergence.

16. The process of claim 15, wherein said first transversely spread stream is of constant thickness from side to side substantially prior to and at said convergence.

17. The process of claim 15, wherein said first stream is a layer of a composite stream.

18. The process of claim 12, wherein the width formed by convergence, is equal to the sum of the widths of the converging streams at the convergence.

19. The process of claim 16, wherein the width formed by convergence, is equal to the sum of the widths of the converging streams at the convergence.

* * * * *